(12) United States Patent
Gan et al.

(10) Patent No.: US 11,272,314 B2
(45) Date of Patent: Mar. 8, 2022

(54) GEOFENCE SELECTION AND MODIFICATION

(71) Applicant: KYNDRYL, INC., New York, NY (US)

(72) Inventors: Seng Chai Gan, Ashburn, VA (US); Shikhar Kwatra, Durham, NC (US); Adam Lee Griffin, Dubuque, IA (US); Vikram Tiwari, Lucknow (IN)

(73) Assignee: Kyndryl, Inc., New York, NY (US)

( * ) Notice: Subject to any disclaimer, the term of this patent is extended or adjusted under 35 U.S.C. 154(b) by 73 days.

(21) Appl. No.: 16/736,148

(22) Filed: Jan. 7, 2020

(65) Prior Publication Data

US 2021/0211831 A1    Jul. 8, 2021

(51) Int. Cl.
*H04W 4/021* (2018.01)
*G06N 20/00* (2019.01)
(Continued)

(52) U.S. Cl.
CPC ...... *H04W 4/021* (2013.01); *G06K 19/07758* (2013.01); *G06N 3/04* (2013.01);
(Continued)

(58) Field of Classification Search
CPC ...... G06N 3/08; G06N 3/04; G06K 19/07758; G08B 25/10; G08B 21/182; G06Q 30/0241
(Continued)

(56) References Cited

U.S. PATENT DOCUMENTS 9,125,169 B2    9/2015    Nichols
9,473,890 B1    10/2016    Liu
(Continued)

FOREIGN PATENT DOCUMENTS

EP    31971041 A    7/2017

OTHER PUBLICATIONS

Mell, Peter et al.; "The NIST Definition of Cloud Computing;" National Institute of Standards and Technology; Special Publication 800-145; Sep. 2011; 7 pages.
(Continued)

*Primary Examiner* — Jack K Wang
(74) *Attorney, Agent, or Firm* — Schmeiser, Olsen & Watts; Ken Han

(57) ABSTRACT

A method and system for selecting and modifying a geofence is provided. The method includes registering a physical object with geofence policies of a user. The physical object is tagged with a digital tag comprising information associated with the user respect and geofence policies. Input data indicating a value, an emotional attachment, and a sentiment of the physical object with respect to the t user is received and the physical object is detected via sensors. Reactions of the user with respect to additional physical objects located within a specified geographical boundary surrounding the first user are detected and a resulting classification for the physical object is generated. A geofence policy is selected and it is detected that the physical object has been removed from a geofence for a specified time period threshold. A resulting action associated with detecting that the physical object has been removed from the geofence is executed.

17 Claims, 10 Drawing Sheets

(51) Int. Cl.
*G06N 3/04* (2006.01)
*G06N 3/08* (2006.01)
*G06K 19/077* (2006.01)
*G08B 21/18* (2006.01)
*G08B 25/10* (2006.01)
*G06Q 30/02* (2012.01)

(52) U.S. Cl.
CPC .............. *G06N 3/08* (2013.01); *G06N 20/00* (2019.01); *G08B 21/182* (2013.01); *G08B 25/10* (2013.01); *G06Q 30/0241* (2013.01)

(58) Field of Classification Search
USPC ..................................................... 340/539.13
See application file for complete search history.

(56) References Cited

U.S. PATENT DOCUMENTS

| | | | | |
|---|---|---|---|---|
| 10,509,100 | B1* | 12/2019 | Reed | G01S 19/03 |
| 10,735,909 | B1* | 8/2020 | Klinkner | H04W 4/021 |
| 2010/0289644 | A1* | 11/2010 | Slavin | G08B 13/2402 |
| | | | | 340/568.1 |
| 2012/0284769 | A1 | 11/2012 | Dixon | |
| 2014/0068451 | A1 | 3/2014 | Ngo | |
| 2014/0351411 | A1 | 11/2014 | Woods | |
| 2017/0094588 | A1* | 3/2017 | Naqvi | H04W 4/021 |
| 2018/0075490 | A1 | 3/2018 | Chintalapoodi | |
| 2019/0034077 | A1* | 1/2019 | Krecioch | G06F 3/04847 |
| 2019/0174284 | A1* | 6/2019 | Gold | G06Q 30/0207 |
| 2019/0182649 | A1 | 6/2019 | Best | |
| 2019/0371096 | A1* | 12/2019 | Fisher | G07C 9/21 |
| 2019/0378391 | A1* | 12/2019 | Miniard | G08B 21/0227 |
| 2020/0209343 | A1* | 7/2020 | Connors | G01S 5/0294 |

OTHER PUBLICATIONS

Axel Küpper et al.; "Geofencing and Background Tracking—The Next Features in LBSs", Proceedings of the 41th Annual Conference of the Gesellschaft für Informatik e.V. (INFORMATIK 2011); Jan. 1, 2011; 14 pages.

* cited by examiner

GEOFENCE SELECTION AND MODIFICATION

BACKGROUND

The present invention relates generally to a method for selecting and modifying geofence capabilities and in particular to a method and associated system for improving geofence technology associated with registering an object with geofence policies of a user and executing an action associated with detecting that the physical object has been removed from a geofence boundary.

SUMMARY

A first aspect of the invention provides a geofence selection and modification method comprising: registering, by a processor of a hardware device, a physical object with geofence policies of a first user; tagging, by the processor, the physical object with a digital tag comprising information associated with the user with respect to the geofence policies; receiving, by the processor, input data indicating a value, an emotional attachment, and a sentiment of the physical object with respect to the first user; detecting, by the processor via sensors of the hardware device, the physical object; monitoring, by the processor via the sensors, reactions of the first user with respect to additional physical objects located within a specified geographical boundary surrounding the first user; generating, by the processor based on analysis of the input data and the reactions of the user, a classification for the physical object; selecting, by the processor based on the classification, a geofence policy of the geofence policies; detecting, by the processor via the sensors, that the physical object has been removed from a first geofence for a specified time period threshold, wherein the first geofence is associated with the geofence policy; and executing, by the processor, an action associated with the detecting that the physical object has been removed from the first geofence.

A second aspect of the invention provides a computer program product, comprising a computer readable hardware storage device storing a computer readable program code, the computer readable program code comprising an algorithm that when executed by a processor of hardware device implements a geofence selection and modification method, the method comprising: registering, by the processor, a physical object with geofence policies of a first user; tagging, by the processor, the physical object with a digital tag comprising information associated with the user with respect to the geofence policies; receiving, by the processor, input data indicating a value, an emotional attachment, and a sentiment of the physical object with respect to the first user; detecting, by the processor via sensors of the hardware device, the physical object; monitoring, by the processor via the sensors, reactions of the first user with respect to additional physical objects located within a specified geographical boundary surrounding the first user; generating, by the processor based on analysis of the input data and the reactions of the user, a classification for the physical object; selecting, by the processor based on the classification, a geofence policy of the geofence policies; detecting, by the processor via the sensors, that the physical object has been removed from a first geofence for a specified time period threshold, wherein the first geofence is associated with the geofence policy; and executing, by the processor, an action associated with the detecting that the physical object has been removed from the first geofence.

A third aspect of the invention provides a hardware device comprising a processor coupled to a computer-readable memory unit, the memory unit comprising instructions that when executed by the processor implements a geofence selection and modification method comprising: registering, by the processor, a physical object with geofence policies of a first user; tagging, by the processor, the physical object with a digital tag comprising information associated with the user with respect to the geofence policies; receiving, by the processor, input data indicating a value, an emotional attachment, and a sentiment of the physical object with respect to the first user; detecting, by the processor via sensors of the hardware device, the physical object; monitoring, by the processor via the sensors, reactions of the first user with respect to additional physical objects located within a specified geographical boundary surrounding the first user; generating, by the processor based on analysis of the input data and the reactions of the user, a classification for the physical object; selecting, by the processor based on the classification, a geofence policy of the geofence policies; detecting, by the processor via the sensors, that the physical object has been removed from a first geofence for a specified time period threshold, wherein the first geofence is associated with the geofence policy; and executing, by the processor, an action associated with the detecting that the physical object has been removed from the first geofence.

The present invention advantageously provides a simple method and associated system capable of accurately selecting and modifying geofence capabilities.

DETAILED DESCRIPTION

Figure 1:
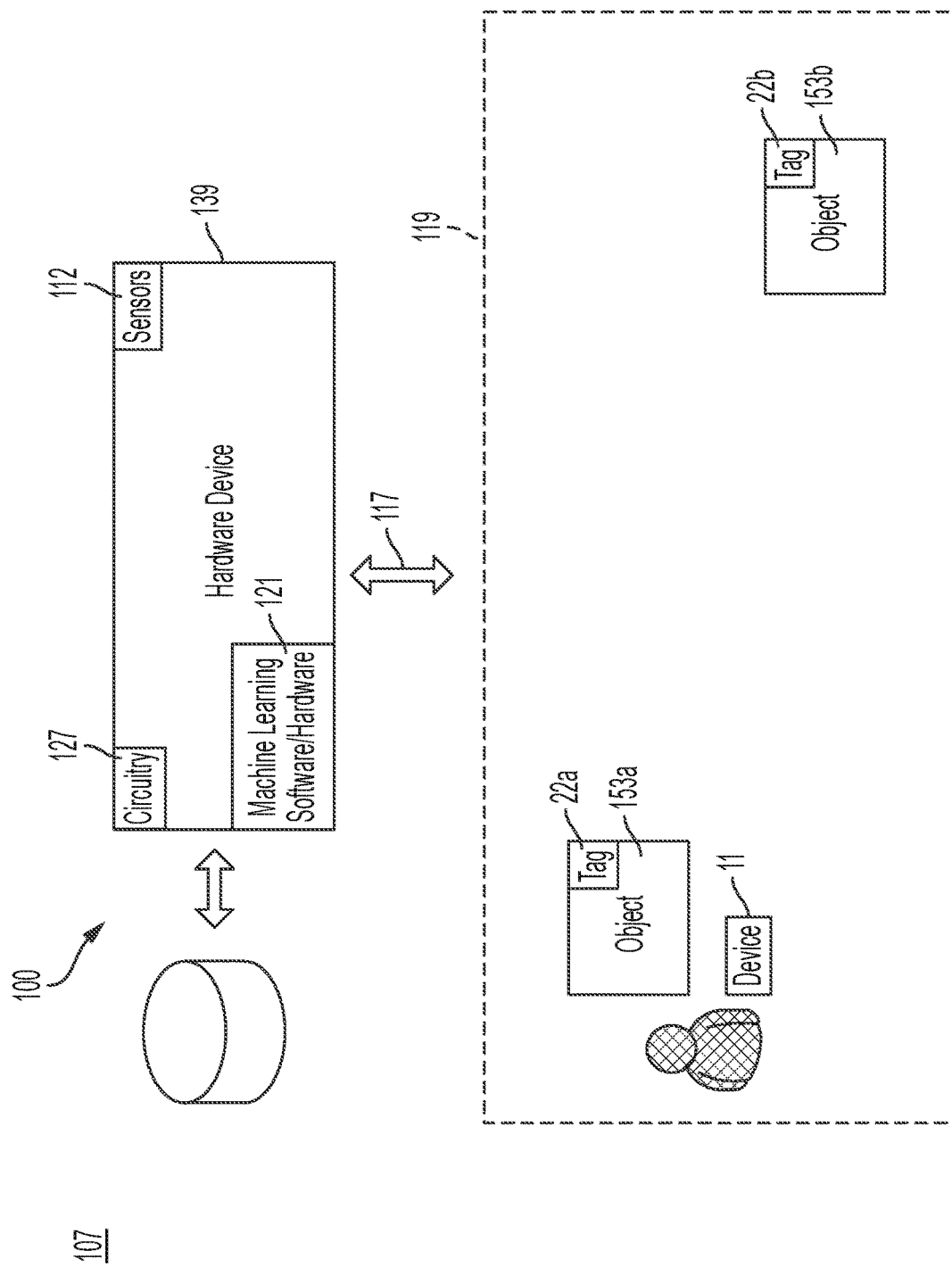
FIG. 1 illustrates a system for improving geofence technology associated with registering objects with geofence policies of a user and executing an action associated with detecting that the objects have been removed from a geofence boundary, in accordance with embodiments of the present invention.

FIG. 1 illustrates a system 100 for improving geofence technology associated with registering an object 153a and/or an object 153b with geofence policies of a user and executing an action associated with detecting that the object 153a and/or object 153b has been removed from a geofence boundary 119, in accordance with embodiments of the present invention. An object may comprise any type of object of value (e.g., a device or apparatus) possessed by a user. For example, an object may comprise, inter alia, a watch, a computer, a phone, an electrical device, a mechanical device, a vehicle, etc. A typical geofence system may be associated with a lack of flexibility and/or customization with respect to object tracking as it relates to physical possessions. For example, specified products may be enabled to trigger an alert based on an object being in located within a specified vicinity with respect to the object being tagged to a known item. However, the current art does not provide an adaptive process to select, adjust, and associate a geofence policy to an object based on object characteristics such as, inter alia, value (e.g., depreciation or appreciation over time), emotional attachment, user specific social aspects, etc. Therefore, system 100 is enabled to: associate a geofence policy with a defined profile, leverage geo-fencing technology, and trigger an alert when an object is detected to be located at a specified distance away from a master object.

System 100 enables an improved system and process for enabling an audio/video device (e.g., a camera) and an object (of a user) recognition process to select an associated geo-fencing policy. A geo-fencing policy may be selected based on an object type, an object value, and a user's emotional attachment with respect to the object. The geofencing policy may be modified based on a user's feedback with respect to a loaning policy. Additionally, multiple objects may be merged and grouped into a same geo-fencing policy based on user feedback history.

System 100 enables the following functionality associated with selecting and modifying geofence capabilities:

An object is registered with respect to a geofencing policy and a digital tag is attached to or integrated with the object. Additionally, input data is identified. The input data describes the object's value and an emotional attachment level with respect to the user. Subsequently, a camera system and regions with convolutional neural networks (R-CNN) are enabled to recognize the object and monitor a user's reaction to objects of value within a specified vicinity of the user. The object is classified based on the object's value, a user based emotional attachment, and a user's sentiment with respect to the object. A geofence policy is selected based on the object's classification. During a detection process, the tagged object is detected at a location with respect to a specified geo-fence for a specified period of time and therefore one of the following actions is executed:

1. If the tagged object is located within a boundary of the specified geofence (i.e., associated with an acquaintance of the user), the user is asked to verify the current position of the object is acceptable. If the user verifies the current position, then the geofence policy is modified via an inclusion/extension of the specified geofence.

2. If the tagged object is not located within a boundary of the specified geofence then the geofence policy is not modified and system 100 alerts the user.

3. Cameras within a vicinity of the tagged object are activated to determine default geofence policy being updated over the temporal duration by gathering context information and assigning a value to the object.

System 100 of FIG. 1 includes a hardware device 139 (i.e., specialized hardware device), objects 153a and 153b, a device 11, and a database 107 (e.g., a cloud-based system) interconnected through a network 117. Objects 153a and 153b and device 11 are located within geofence boundary 119. Hardware device 139 includes specialized circuitry 127 (that may include specialized software), sensors 112, and machine learning software code/hardware structure 121 (i.e., including machine learning software code). Objects 153a and 153b may include any type of object of value (e.g., device or apparatus such as a watch, a computer, etc.) of a user. Objects 153a and 153b include tags 22a and 22b (e.g., RFID tags) for tracking and identifying objects 153a and 153b. Device 11 may include, inter alia, a smart phone, a tablet computer, a computing device, etc. Device 11 may be Bluetooth enabled to provide connectivity to each other and any type of system. Sensors 112 may include any type of internal or external sensor (or biometric sensor) including, inter alia, ultrasonic three-dimensional sensor modules, a heart rate monitor, a blood pressure monitor, a temperature sensor, a pulse rate monitor, an ultrasonic sensor, an optical sensor, a video retrieval device, an audio retrieval device, humidity sensors, voltage sensors, etc. Hardware device 139 may comprise an embedded device. An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, hardware device 139 may comprise a specialized hardware device comprising specialized (non-generic) hardware and circuitry (i.e., specialized discrete non-generic analog, digital, and logic-based circuitry) for (independently or in combination) executing a process described with respect to FIGS. 1-6. The specialized discrete non-generic analog, digital, and logic-based circuitry may include proprietary specially designed components (e.g., a specialized integrated circuit, such as for example an Application Specific Integrated Circuit (ASIC) designed for only implementing an automated process for improving geofence technology associated with registering an object 153a and/or an object 153b with geofence policies of a user and executing an action associated with detecting that the object 153a and/or object 153b has been removed from a geofence boundary 119. Network 117 may include any type of network including, inter alia, a 5G telecom network, a local area network, (LAN), a wide area network (WAN), the Internet, a wireless network, etc. Alternatively, network 117 may include an application programming interface (API).

System 100 enables the following implementation process for dynamically detecting a location of an object and executing an action with respect to a geofence policy:

The process is initiated when a user tags a new object and enables a video device/system to recognize the object. Subsequently, the user provides input with respect to the object's value and emotional attachment level of the object. In response, the video device/system polls an R-CNN engine to enable object recognition. Additionally, the video device/ system executes an encoder-decoder module to detect a user's reactions with respect to objects under consideration or within the vicinity of the primary user. The video device/system is configured to select an existing geofence policy that matches the object's classification attributes. Alternatively, the video device/system may dynamically assign a geofence policy based on referencing results of the aforementioned polling process (i.e., with respect to the R-CNN engine) via execution of a sentiment analysis process using an emotion analyzer API. In response, the video device/system analyzes user reactions to different objects thereby indicating a value of the objects under consideration. Semi-supervised reinforcement learning code is executed for enabling a process for monitoring a user's surroundings by ingesting an output of the R-CNN engine as an input parameter for an SSRL model. Likewise, an output of the emotion analyzer API is ingested for detecting a sentiment of the user to determine a value of an object to assign a dynamic geofence policy for the specific user. The object is digitally tagged with respect to a determined geofence policy. Subsequently, the tagged object is detected (for a specified time period) outside a geo-fence boundary and the following processes may be executed:

1. If the tagged object is detected within a geo-fence boundary of an acquaintance of the user, then a request is generated and transmitted to the user to verify if the tagged object is authorized within the geo-fence boundary. If the user approves the authorization, then the associated geo-fence policy is modified via inclusion/extension of the geofence boundary.
2. If the tagged object is not detected within a geo-fence boundary of an acquaintance of the user, then the associated geo-fence policy is not modified.
3. Cameras within a geofence boundary may be activated to determine default geofence policy which may be updated with respect to a temporal duration D by gathering context information and assigning a value to the object via the SSRL module.

System 100 enables a process for merging multiple geofence policies as follows: All objects that sharing a same geofence policy may be grouped/merged together based on object type, values, and emotional attachment using K-means clustering code with respect to taking into a reward function of an SSRL model. An object classification rule may be created to select a merged geofence policy and an object classification rule and the merged geofence policy may be used to select a geo-fence policy for any newly tagged objects.

System 100 enables the following process for detecting user/object attributes and modifying a geofence policy:

The process is initiated when a camera (i.e., a video retrieval device) module running a CNN engine is configured to classify objects from items identified within a user profile. An item is classified at a time T and a sentiment analysis is executed with respect to the objects and an associated user association with the objects. Subsequently, a primary camera C1 or an alternate camera C2 retrieves facial expressions of the user and verbal communications regarding the objects and the objects are weighted in accordance. Likewise, a TF-IDF framework increases a likelihood of a worthiness of the objects for the specific user. Additionally, associative clustering code is executed with respect to a user's emotion and an identified object via an RCNN module to feed to an RL model. Camera C2 is polled for monitoring user emotion and a text-based sentiment analysis is executed if the user is presenting the object to an additional user.

Figure 2:
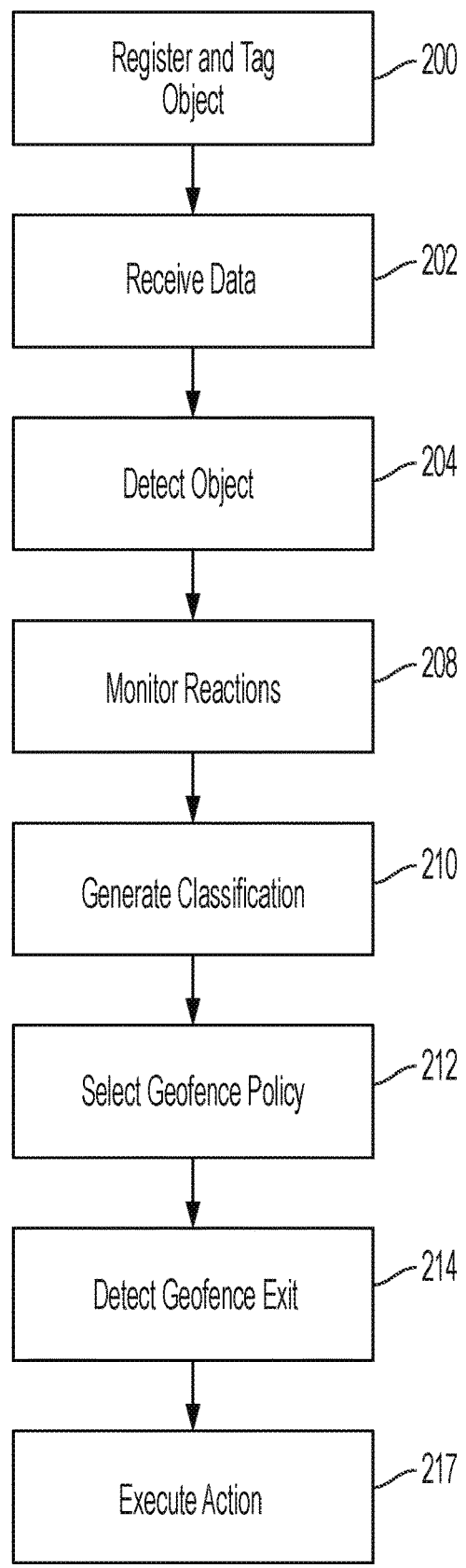
FIG. 2 illustrates an algorithm detailing a process flow enabled by the system of FIG. 1 for improving geofence technology associated with registering objects with geofence policies of a user and executing an action associated with detecting that the objects have been removed from a geofence boundary, in accordance with embodiments of the present invention.

FIG. 2 illustrates an algorithm detailing a process flow enabled by system 100 of FIG. 1 for improving geofence technology associated with registering objects with geofence policies of a user and executing an action associated with detecting that the objects have been removed from a geofence boundary, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed in combination by hardware device 139. In step 200, a physical object is registered with geofence policies of a user. The physical object is tagged with a digital tag including information associated with the user with respect to the geofence policies. The physical object may include an electrical object and/or a mechanical object of the first user.

In step 202, input data indicating a value, an emotional attachment, and a sentiment of the physical object with respect to the user is received. In step 204, the physical object is detected via sensors of a hardware device. The sensors may include, inter alia, a video camera, an optical sensor, a machine learning model sensor, a reinforcement learning sensor, a vision recognition model sensor, an infrared sensor, and a region convolutional neural network (R-CNN) sensor, etc.

In step 208, reactions of the user with respect to additional physical objects located within a specified geographical boundary surrounding the user are monitored via the sensors. In step 210, a classification for the physical object is generated based on analysis of the input data and the reactions of the user. In step 212, a geofence policy is selected based on the classification. In step 214, it is detected (via the sensors) that the physical object has been removed from a first geofence (associated with the geofence policy) for a specified time period threshold. In step 217, an action is executed. The action is associated with detecting that the physical object has been removed from the first geofence. Executing the action may result in the following processes:

A first process is associated with detecting that the physical object has entered a second geofence associated with the geofence policy. In response, it is determined (based on analysis of an associated digital tag) that the second geofence is associated with a second user associated with the first user. Subsequently, an approval for the physical object to be located within the second geofence is received from the first user and the geofence policy is modified to include permissions for the physical object to be located within the second geofence.

A second process is associated with detecting that the physical object has entered a second geofence associated with the geofence policy. In response, it is determined (based on analysis of an associated digital tag) that the second geofence is associated with a second user associated with the first user. Subsequently, a disapproval for the physical object to be located within the second geofence is received from the first user and the geofence policy is modified to include restrictions for the physical object to be restricted from being located within the second geofence.

A third process is associated with detecting that the physical object has entered a second geofence associated with the geofence policy. In response, it is determined (based on analysis of an associated digital tag) that the second geofence is not associated with a user associated with the first user. In response, an alert indicating that the physical object has entered the second geofence is generated and transmitted to the first user and an authoritative entity.

A fourth process is associated with detecting that the physical object has entered a second geofence. In response, additional sensors are activated within the second geofence and a default geofence policy for the second geofence is determined. The default geofence policy is updated by retrieving context information of the second geofence and assigning a value indicator to the physical object.

Figure 3:
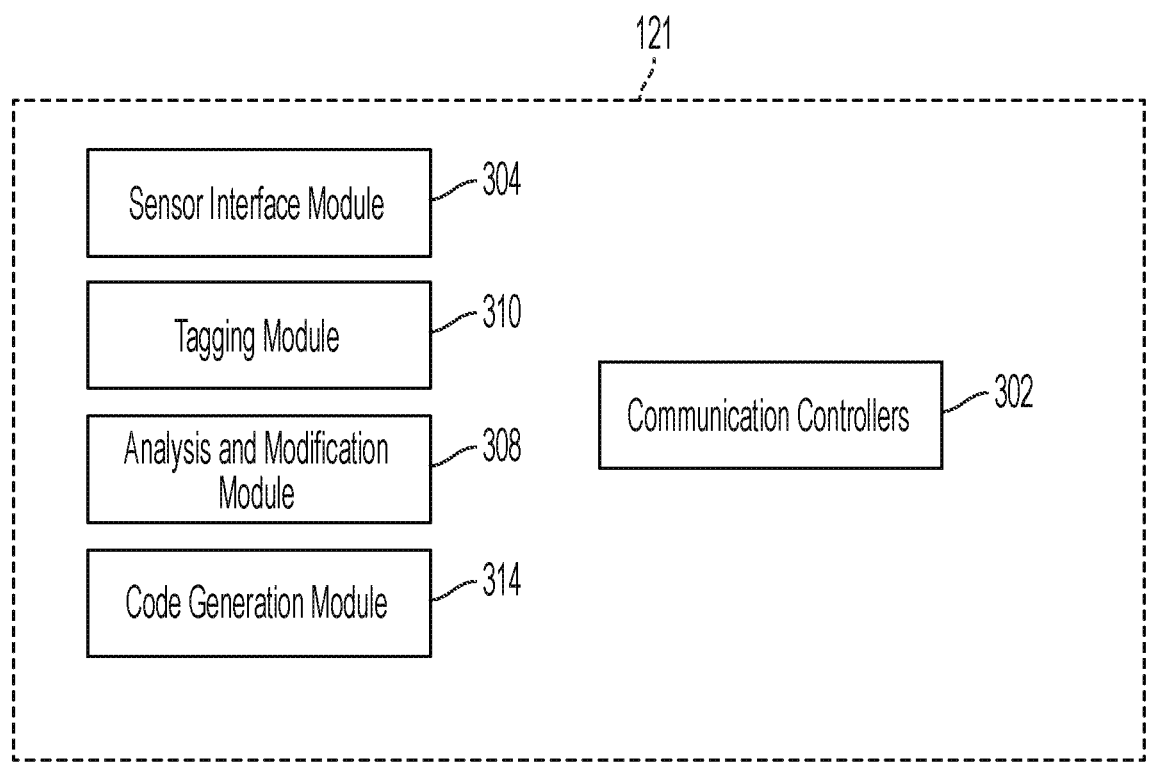
FIG. 3 illustrates an internal structural view of the machine learning software/hardware structure of FIG. 1, in accordance with embodiments of the present invention.

FIG. 3 illustrates an internal structural view of a machine learning software/hardware structure 121 (and/or circuitry 127), in accordance with embodiments of the present invention. Machine learning software/hardware structure 121 includes a sensor interface module 304, a tagging module 310, an analysis and modification module 308, a code generation module 314, and communication controllers 302. Sensor interface module 304 comprises specialized hardware and software for controlling all functions related to sensors 110 or tags 22a and 22b of FIG. 1. Tagging module 310 comprises specialized hardware and software for controlling all functionality related control of all tagging functions for implementing the process described with respect to the algorithm of FIG. 2. Analysis and modification module 308 comprises specialized hardware and software for controlling all functions related to the analysis and modification steps of FIG. 2. Code generation module 314 comprises specialized hardware and software for controlling all functions related to generating machine learning feedback for generating machine learning software code for executing future geofence selection and modification processes. Communication controllers 302 are enabled for controlling all communications between sensor interface module 304, tagging module 310, analysis and modification module 308, and code generation module 314.

Figure 4:
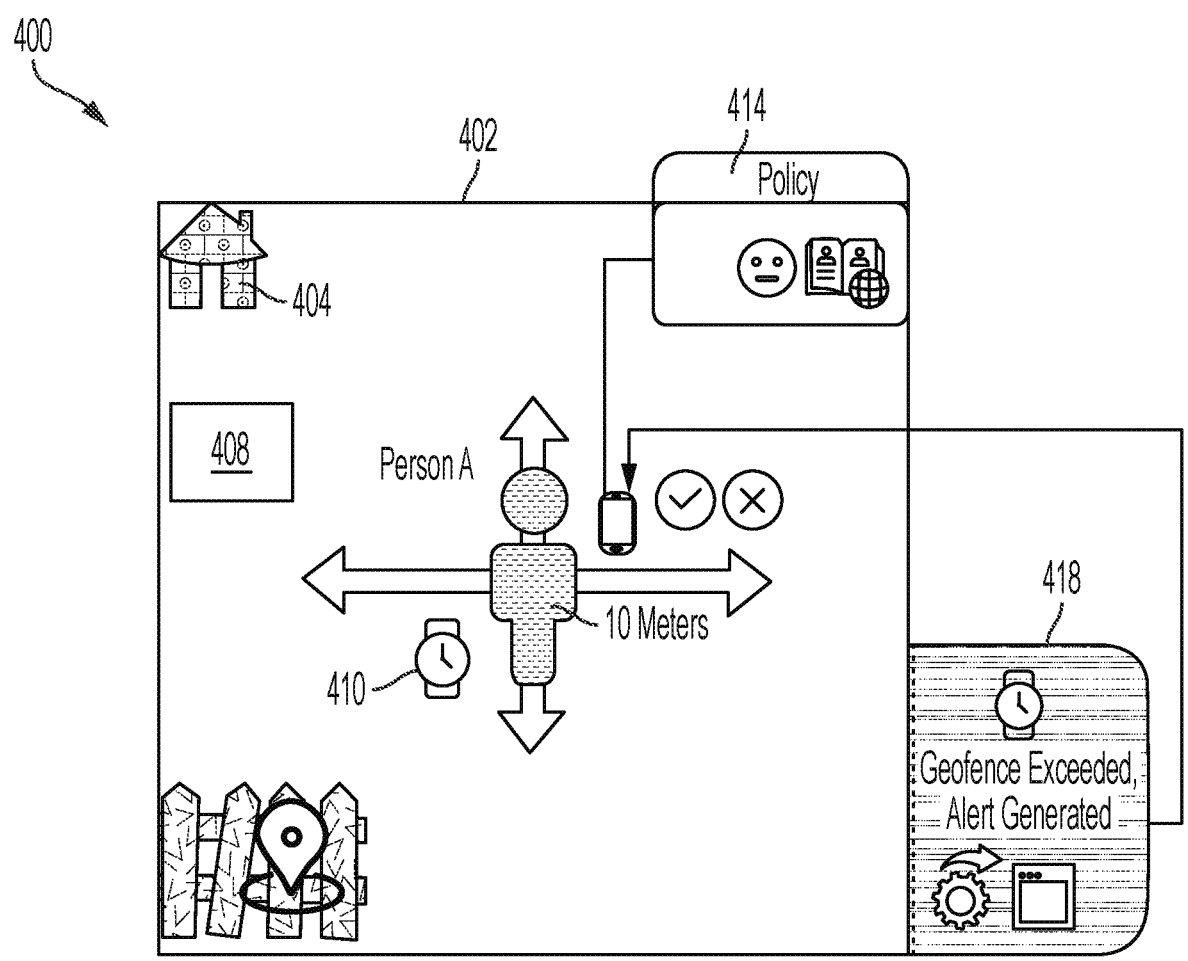
FIG. 4 illustrates a system for enabling an implementation process for selecting and modifying a geofence policy, in accordance with embodiments of the present invention.

FIG. 4 illustrates a system 400 for enabling an implementation process for for selecting and modifying a geofence policy, in accordance with embodiments of the present invention. The process for selecting an associated geofence policy is associated with a geofence 402 of a person A. Geofence 402 comprises a 30 ft boundary surrounding person A, a structure 404 belonging to person A, and an automobile belonging to person A. The process is initiated when person A periodically loans a designer watch 410 to his brothers. Person A initiates a geofence policy 414 indicating that any watch valued at less than $1,000 should not generate an alert if the watch is detected within geofence 402 or a geofence belonging to any of his brothers. Likewise, person A does not typically loan out any of watches valued at more than $1,000. Therefore, geofence policy 414 (of person A) indicates that for a watch valued at more than $1,000, usage of this watch is restricted to him only thereby creating differentiation within a property policy as defined within a profile of Person A. Additionally, person A is determined to be emotionally attached to a specified watch that was given to him by his grandfather. Therefore (although the watch is valued at less than $1000), he does not typically loan out this watch even though it is valued at less than $1,000. Therefore, an additional segmentation policy is further defined in a subcategory of the geofence policy 414. Geofence policy 414 is selected for person A with respect to a watch collection based on a cost and emotional attachment thereby generating an overall property policy profile. An additional alerting policy may be generated with respect to alerting person A that a watch is located external to geofence 414 for a specified time period. The alert 418 may be generated based on a cost and emotional attachment. For example: person A may be alerted if a $3000 watch is detected external to geofence 414 for at least 30 minutes or more. Likewise, person A is alerted if a $500 watch detected external to geofence 414 for more than 5 hours. Therefore, geofence policy 414 may be explicitly configured by person A. Additionally, a device with a camera(s) or system of networked cameras (e.g., IoT home video feeds) may be implemented to detect and recognize a newly tagged object as a watch thereby allowing person A to input a price of the watch and an associated level of emotional attachment to the watch in addition a historical sentiment related to the watch. Likewise, person A's relationship may be refined over time. Based on input, a proper geofence policy is selected for each watch. Additional tracking devices may be implemented. Additional tracking devices may include, inter alia, microelectronic wafers, smart card modules, RFID dust, RFID tags, etc.

The process for adjusting an associated geofence policy is associated with geofence 402 of person A. The process is initiated when person A enables his phone camera to detect and recognize a newly tagged object as a watch (e.g., watch 410). Subsequently, person A enters a price of the watch and an associated level of emotional attachment to the watch. Therefore, a default geofence policy is initiated with respect to Person A. The default geofence policy comprises acceptable distances (for the watch) defined as: next to him, in his house, and in his car. Subsequently, person A loans his watch to his brother C and in response person A receives an alert that his watch is no longer with him and is with his brother C. The alert verifies if this is okay and if person A specifies that is fine then the geofence policy is modified dynamically based on Person A's concurrence/acceptance. Likewise (via a series of feedback from Person A) the watch's geofence policy is modified to include an extension of geofence approvals to all of his brothers. When there are sufficient watches with a same geofence policy (i.e., loan to brothers), they are grouped together as geofence policy for a watch valued at less than $1,000 with low emotional attachment. When person A tags a new watch and inputs a value and emotional attachment, the adapted geofence policy is selected by default with an option for person A to create any exceptions. Additionally, when person B is associated with a new brother-in-law regularly borrowing his watch, the new brother-in-law is be added to the existing geofence policy. Therefore, the geofence policy is adaptive with respect to the growth of Person A's social and/or trusted and/or approved network of relationships.

Figure 5:
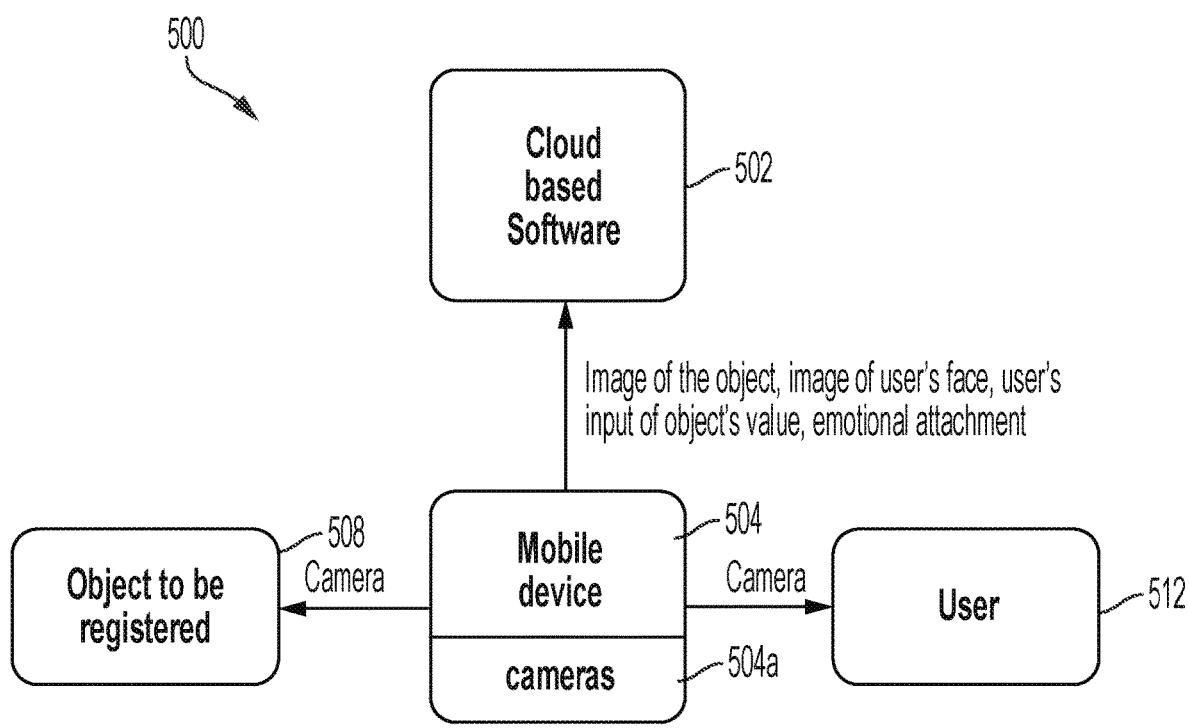
FIG. 5 illustrates an object registration system, in accordance with embodiments of the present invention.

FIG. 5 illustrates an object registration system 500, in accordance with embodiments of the present invention. System 500 enables a software application 502 within a mobile device 504 (comprising cameras 504a) to register an object 508. The object 508 is tagged with an IoT tag and an image of the object 508, a user 512 face, and user input are transmitted to a system for analysis. The user input includes the object 508 value, type, and user emotional attachment to the object 508. Alternatively, one or more of the user's inputs may be substituted or supplemented by image processing of images of the object 508 and the user 512. A geofence policy selection algorithm is executed for selecting a geofence policy for the registered object.

Figure 6:
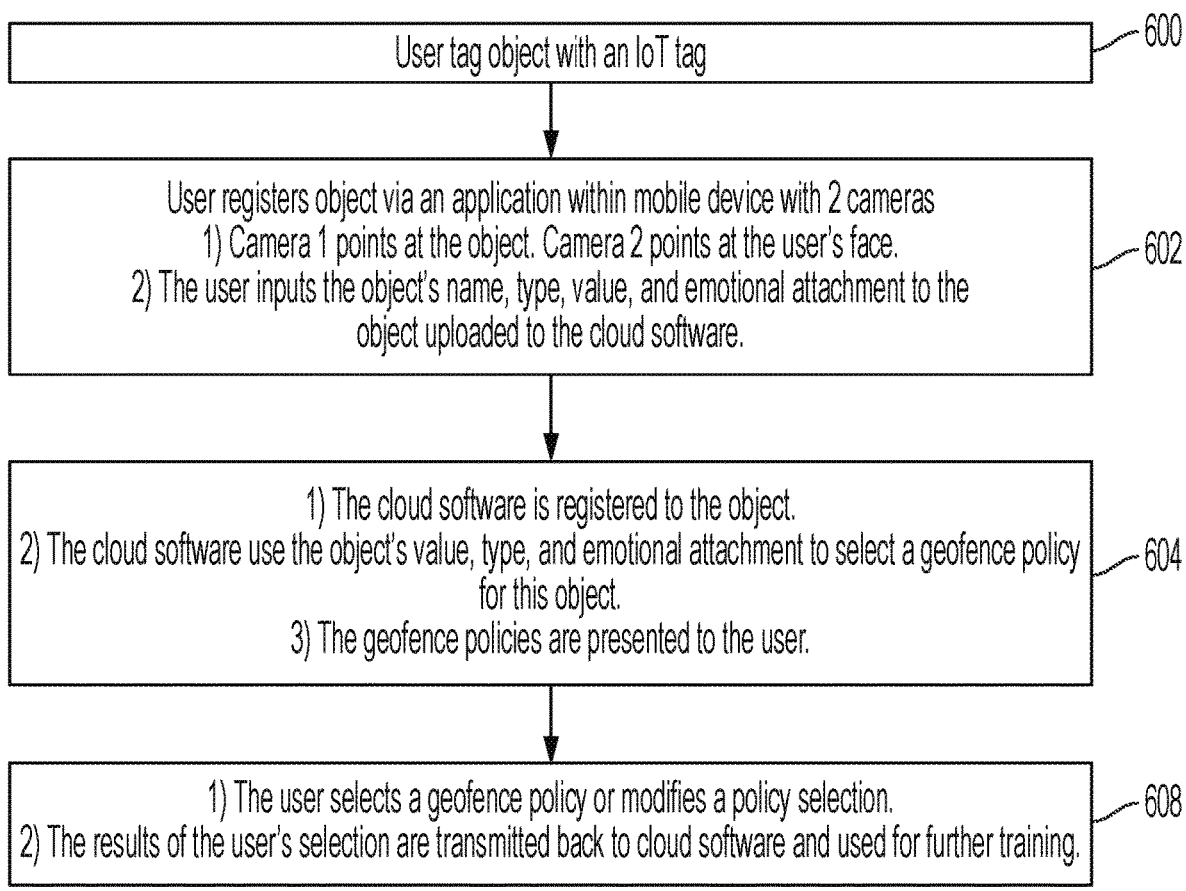
FIG. 6 illustrates an algorithm executed by the object registration system of FIG. 5, in accordance with embodiments of the present invention.

FIG. 6 illustrates an algorithm executed by object registration system 500 of FIG. 5, in accordance with embodiments of the present invention. In step 600, a user tags an object with an IoT tag. In step 602, the user registers the object via execution of an application within a mobile device comprising two cameras. In response, a camera 1 is pointed at the object and a camera 2 is pointed at the users face. Additionally, the user inputs a name, type, value, and emotional attachment value with respect to the object. All input data is uploaded to cloud software. In step 604, the cloud software is registered to the object. The cloud software is configured to select geofence policies based on the input data. The geofence policies are presented to the user. In step 608, the user selects a geofence policy or modifies a geofence policy selection. The selection results are transmitted to the cloud software for training the software.

Figure 7:
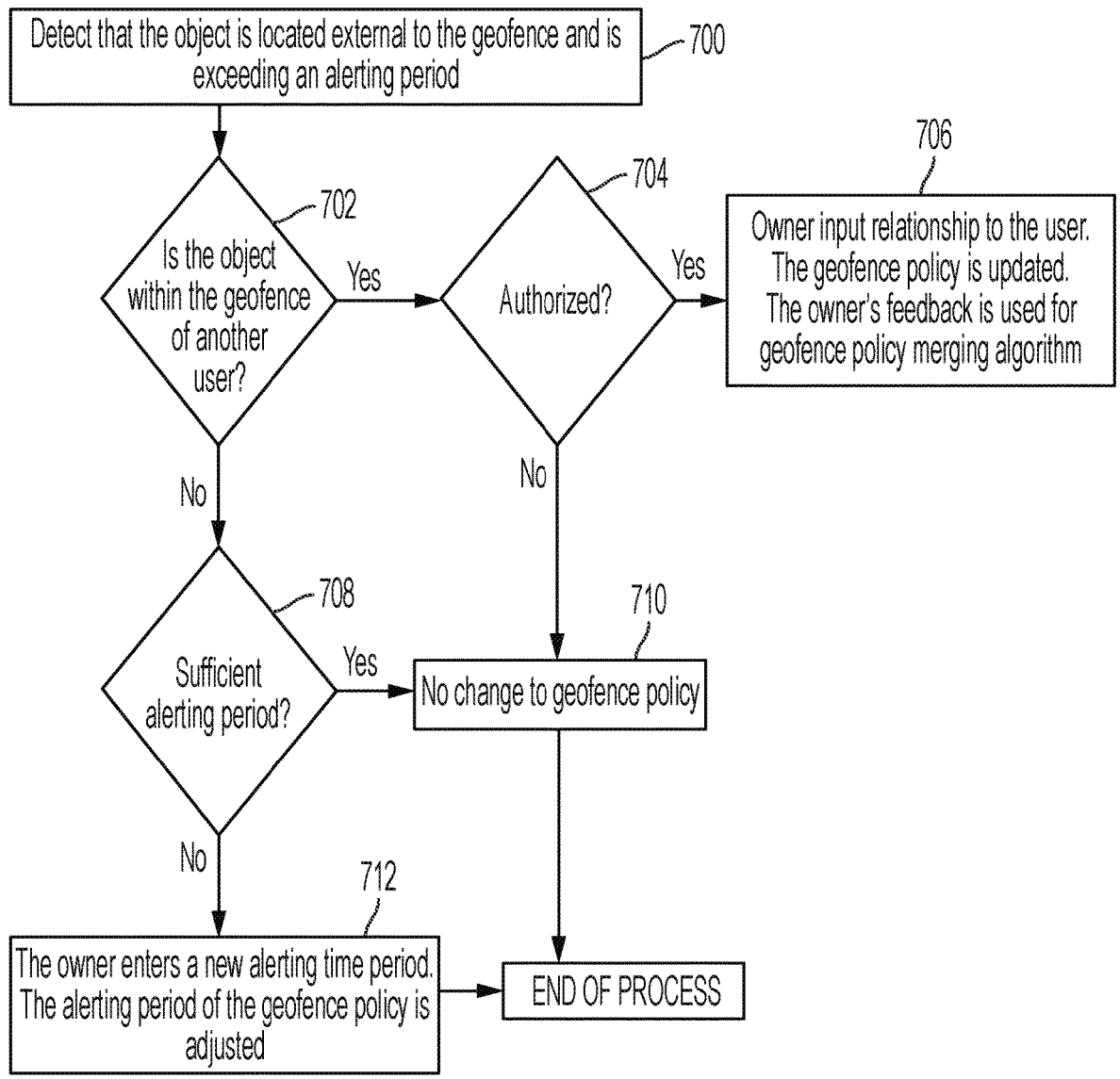
FIG. 7 illustrates an algorithm for implementing an alerting process, in accordance with embodiments of the present invention.

FIG. 7 illustrates an algorithm for implementing an alerting process, in accordance with embodiments of the present invention. In step 700, an object is detected to be located external to a geofence boundary of an owner of the object for a specified time period exceeding an alert activation time period. In step 702, it is determined if the object has been detected within a boundary of a geofence of a user (differing from the object owner).

If in step 702, it is determined if the object has been detected within a boundary of a geofence of the user then in step 704, the object owner is asked to verify if the object is authorized to be located within the boundary of the geofence of the user. If in step 704, the object owner verifies that the object is authorized to be located within the boundary of the geofence of the user then in step 706, it is determined that the object owner has a relationship with the user and the geofence policy is updated. Additionally, feedback from the object owner is entered within a policy merging algorithm for updating machine learning software. If in step 704, the object owner verifies that the object is not authorized to be located within the boundary of the geofence of the user then in step 710, the geofence policy is not updated.

If in step 702, it is determined if the object has not been detected within a boundary of a geofence of the user then in step 708, it is determined if an alert time period is sufficient. If in step 708, it is determined that the alert time period is sufficient then in step 710, the geofence policy is not updated. If in step 708, it is determined that the alert time period is not sufficient then in step 710, the object owner enters a new alert time period and the geofence policy is updated accordingly.

Figure 8:
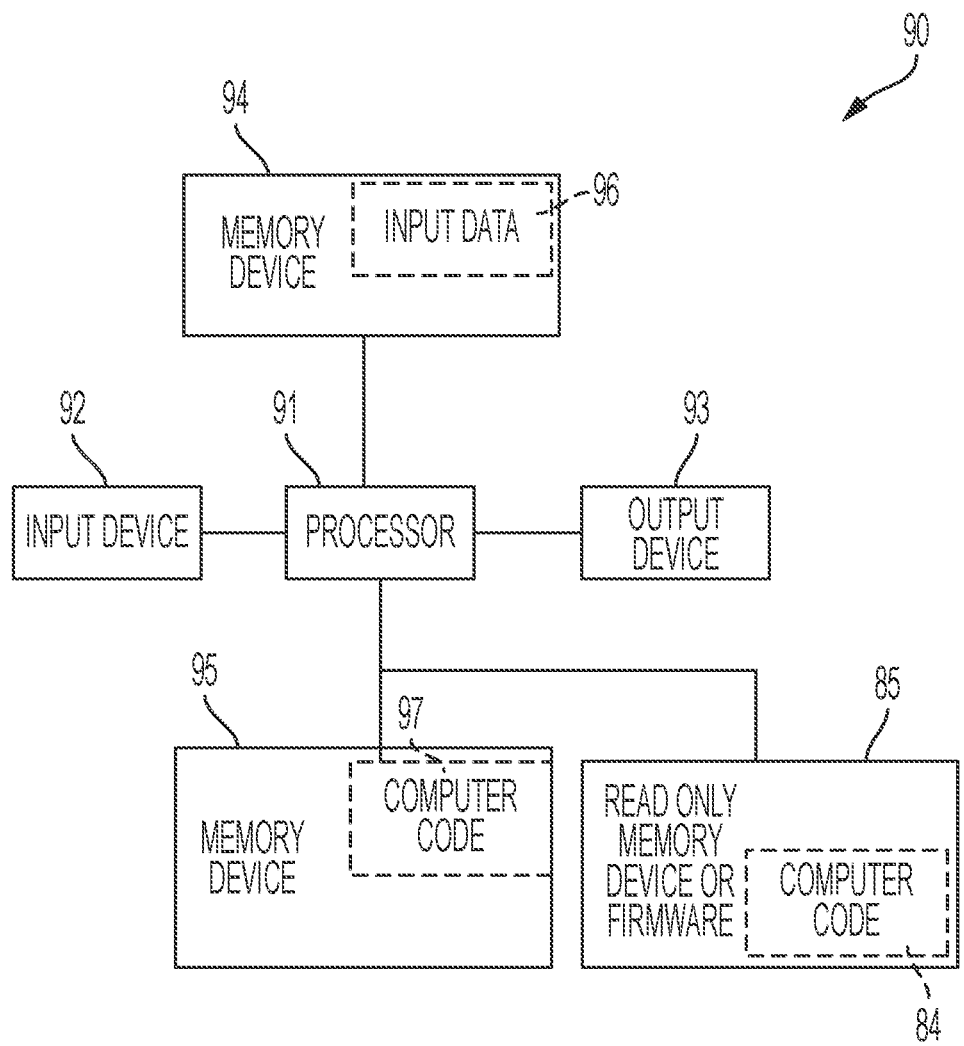
FIG. 8 illustrates a computer system used by the system of FIG. 1 for improving geofence technology associated with registering objects with geofence policies of a user and executing an action associated with detecting that the objects have been removed from a geofence boundary, in accordance with embodiments of the present invention.

FIG. 8 illustrates a computer system 90 (e.g., hardware device 139 of FIG. 1) used by or comprised by the system of FIG. 1 for improving geofence technology associated with registering objects with geofence policies of a user and executing an action associated with detecting that the objects have been removed from a geofence boundary, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 6 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random-access memory (DRAM), a read-only memory (ROM), etc. The memory device 95 includes a computer code 97. The computer code 97 includes algorithms (e.g., the algorithm of FIG. 2) for improving geofence technology associated with registering objects with geofence policies of a user and executing an action associated with detecting that the objects have been removed from a geofence boundary. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as Read-Only Memory (ROM) device or firmware 85) may include algorithms (e.g., the algorithm of FIG. 2) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as ROM device or firmware 85, or may be accessed by processor 91 directly from such a static, nonremovable, read-only medium. Similarly, in some embodiments, stored computer program code 97 may be stored as ROM device or firmware 85, or may be accessed by processor 91 directly from such ROM device or firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve geofence technology associated with registering objects with geofence policies of a user and executing an action associated with detecting that the objects have been removed from a geofence boundary. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving geofence technology associated with registering objects with geofence policies of a user and executing an action associated with detecting that the objects have been removed from a geofence boundary. In another embodiment, the invention provides a business method that performs the process steps of the invention on a subscription, advertising, and/or fee basis. That is, a service supplier, such as a Solution Integrator, could offer to enable a process for improving geofence technology associated with registering objects with geofence policies of a user and executing an action associated with detecting that the objects have been removed from a geofence boundary. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 8 shows the computer system 90 as a configuration of hardware and software, any configuration of hardware and software, as would be known to a person of ordinary skill in the art, may be utilized for the purposes stated supra in conjunction with the computer system 90 of FIG. 8. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
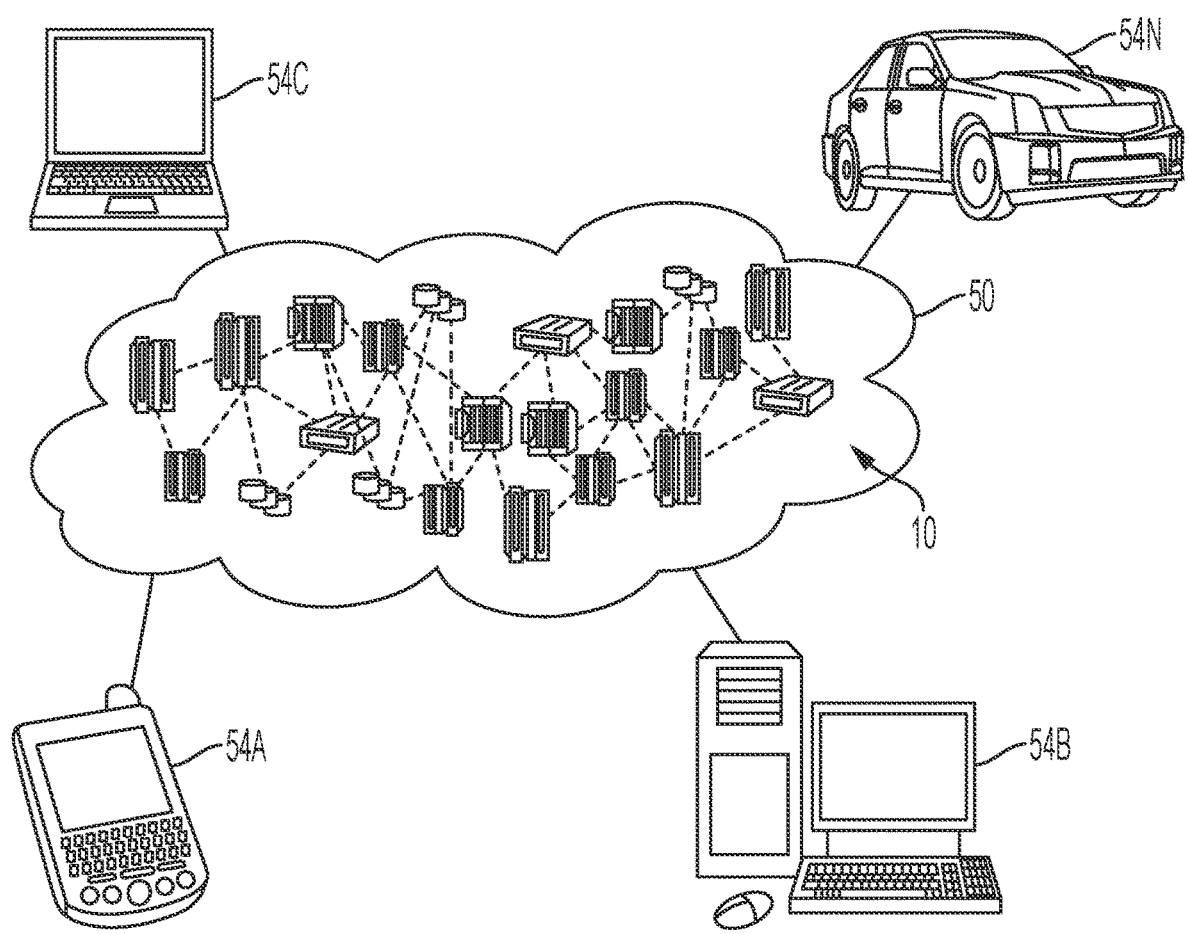
FIG. 9 illustrates a cloud computing environment, in accordance with embodiments of the present invention.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 9 are intended to be illustrative only and that computing nodes 10 and cloud computing environment 50 can communicate with any type of computerized device over any type of network and/or network addressable connection (e.g., using a web browser).

Figure 10:
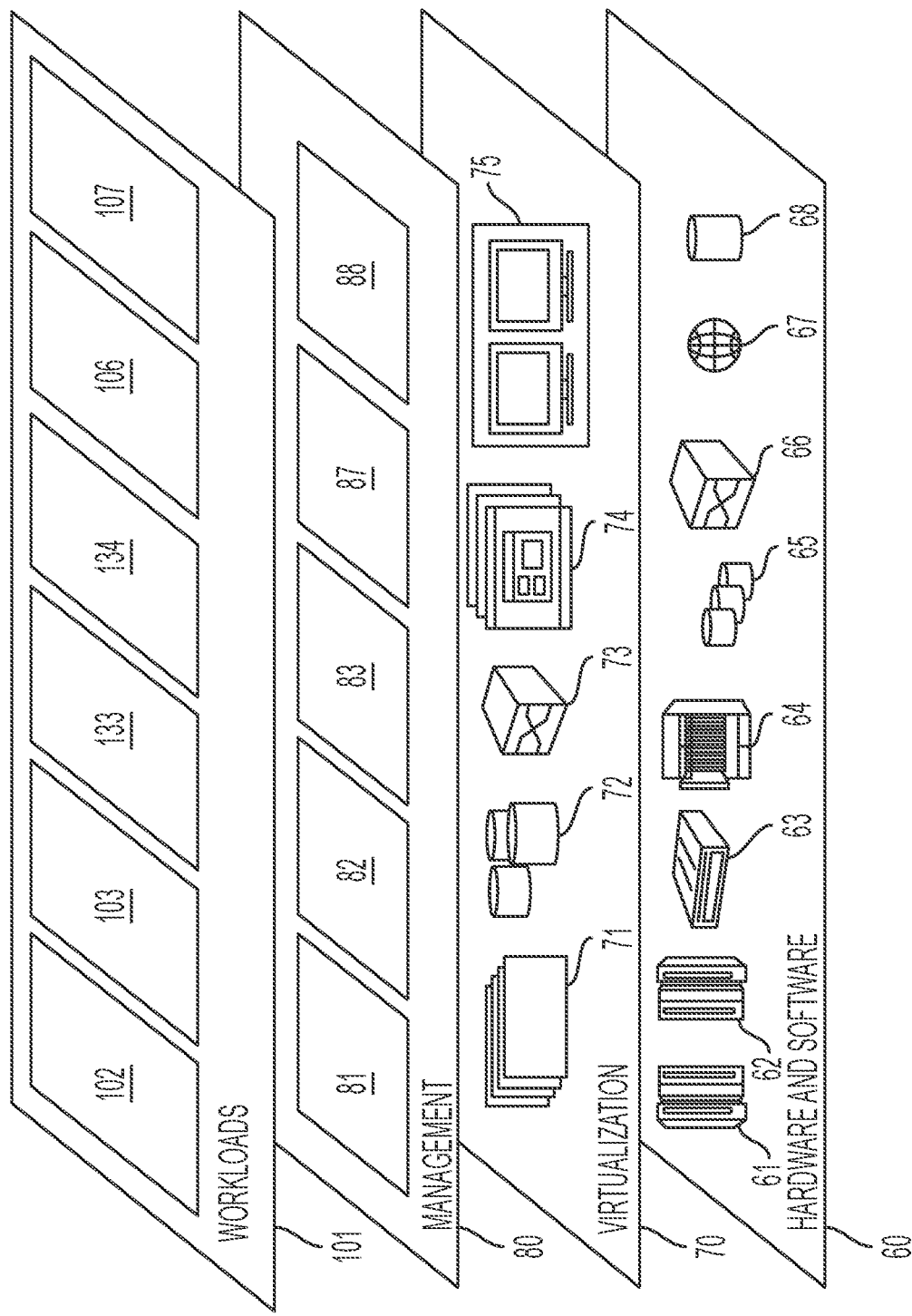
FIG. 10 illustrates a set of functional abstraction layers provided by cloud computing environment, in accordance with embodiments of the present invention.

Referring now to FIG. 10, a set of functional abstraction layers provided by cloud computing environment 50 (see FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 87 provides cloud computing resource allocation and management such that required service levels are met. Service Level Agreement (SLA) planning and fulfillment 88 provide pre-arrangement for, and procurement of, cloud computing resources for which a future requirement is anticipated in accordance with an SLA.

Workloads layer 101 provides examples of functionality for which the cloud computing environment may be utilized. Examples of workloads and functions which may be provided from this layer include: mapping and navigation 102; software development and lifecycle management 103; virtual classroom education delivery 133; data analytics processing 134; transaction processing 106; and for improving geofence technology associated with registering objects with geofence policies of a user and executing an action associated with detecting that the objects have been removed from a geofence boundary 107.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A geofence selection and modification method comprising:
    registering, by a processor of a hardware device, a physical object with geofence policies of a first user;
    tagging, by said processor, said physical object with a digital tag comprising information associated with said user with respect to said geofence policies;
    receiving, by said processor, input data indicating a value, an emotional attachment, and a sentiment of said physical object with respect to said first user;
    detecting, by said processor via sensors of said hardware device, said physical object;
    monitoring, by said processor via said sensors, reactions of said first user with respect to additional physical objects located within a specified geographical boundary surrounding said first user;
    generating, by said processor based on analysis of said input data and said reactions of said user, a classification for said physical object;
    selecting, by said processor based on said classification, a geofence policy of said geofence policies;
    detecting, by said processor via said sensors, that said physical object has been removed from a first geofence for a specified time period threshold, wherein said first geofence is associated with said geofence policy; and
    executing, by said processor, an action associated with said detecting that said physical object has been removed from said first geofence, wherein said executing said action comprises:
        detecting that said physical object has entered a second geofence associated with said geofence policy;
        determining, based on analysis of said digital tag, that said second geofence is associated with a second user associated with said first user;
        receiving, from said first user, a disapproval for said physical object to be located within said second geofence; and
        modifying said geofence policy to include restrictions for said physical object to restricted from being located within said second geofence.

2. The method of claim 1, wherein said executing said action further comprises:
    receiving, from said first user, an approval for said physical object to be located within said second geofence; and
    modifying said geofence policy to include permissions for said physical object to be located within said second geofence.

3. The method of claim 1, wherein said executing said action further comprises:
    determining, based on analysis of said digital tag, that said second geofence is not associated with a user associated with said first user;
    generating, an alert indicating that said physical object has entered said second geofence; and
    transmitting said alert to said first user and an authoritative entity.

4. The method of claim 1, wherein said executing said action further comprises:
    activating additional sensors within said second geofence;
    determining, based on results of said activating, a default geofence policy for said second geofence; and
    updating said default geofence policy by retrieving context information of said second geofence and assigning a value indicator to said physical object.

5. The method of claim 1, wherein said sensors comprise specialized sensors selected from the group consisting of a video camera, an optical sensor, a machine learning model sensor, a reinforcement learning sensor, a vision recognition model sensor, an infrared sensor, and a region convolutional neural network (R-CNN) sensor.

6. The method of claim 1, wherein said physical object comprises an electrical object of said first user.

7. The method of claim 1, wherein said physical object comprises a mechanical object of said first user.

8. The method of claim 1, further comprising:
    providing at least one support service for at least one of creating, integrating, hosting, maintaining, and deploying computer-readable code in the control hardware, said code being executed by the computer processor to implement: said registering, said tagging, said receiving, said detecting said physical object, said monitoring, said generating, said selecting, said detecting that said physical object has been removed, and said executing.

9. A computer program product, comprising a computer readable hardware storage device storing a computer readable program code, said computer readable program code comprising an algorithm that when executed by a processor of hardware device implements a geofence selection and modification method, said method comprising:
- registering, by said processor, a physical object with geofence policies of a first user;
- tagging, by said processor, said physical object with a digital tag comprising information associated with said user with respect to said geofence policies;
- receiving, by said processor, input data indicating a value, an emotional attachment, and a sentiment of said physical object with respect to said first user;
- detecting, by said processor via sensors of said hardware device, said physical object;
- monitoring, by said processor via said sensors, reactions of said first user with respect to additional physical objects located within a specified geographical boundary surrounding said first user;
- generating, by said processor based on analysis of said input data and said reactions of said user, a classification for said physical object;
- selecting, by said processor based on said classification, a geofence policy of said geofence policies;
- detecting, by said processor via said sensors, that said physical object has been removed from a first geofence for a specified time period threshold, wherein said first geofence is associated with said geofence policy; and
- executing, by said processor, an action associated with said detecting that said physical object has been removed from said first geofence, wherein said executing said action comprises:
  - detecting that said physical object has entered a second geofence associated with said geofence policy;
  - determining, based on analysis of said digital tag, that said second geofence is associated with a second user associated with said first user;
  - receiving, from said first user, a disapproval for said physical object to be located within said second geofence; and
  - modifying said geofence policy to include restrictions for said physical object to restricted from being located within said second geofence.

10. The computer program product of claim 9, wherein said executing said action further comprises:
- receiving, from said first user, an approval for said physical object to be located within said second geofence; and
- modifying said geofence policy to include permissions for said physical object to be located within said second geofence.

11. The computer program product of claim 9, wherein said executing said action further comprises:
- determining, based on analysis of said digital tag, that said second geofence is not associated with a user associated with said first user;
- generating, an alert indicating that said physical object has entered said second geofence; and
- transmitting said alert to said first user and an authoritative entity.

12. The computer program product of claim 9, wherein said executing said action further comprises:
- activating additional sensors within said second geofence;
- determining, based on results of said activating, a default geofence policy for said second geofence; and
- updating said default geofence policy by retrieving context information of said second geofence and assigning a value indicator to said physical object.

13. The computer program product of claim 9, wherein said sensors comprise specialized sensors selected from the group consisting of a video camera, an optical sensor, a machine learning model sensor, a reinforcement learning sensor, a vision recognition model sensor, an infrared sensor, and a region convolutional neural network (R-CNN) sensor.

14. The computer program product of claim 9, wherein said physical object comprises an electrical object of said first user.

15. The computer program product of claim 9, wherein said physical object comprises a mechanical object of said first user.

16. A hardware device comprising a processor coupled to a computer-readable memory unit, said memory unit comprising instructions that when executed by the processor implements a geofence selection and modification method comprising:
- registering, by said processor, a physical object with geofence policies of a first user;
- tagging, by said processor, said physical object with a digital tag comprising information associated with said user with respect to said geofence policies;
- receiving, by said processor, input data indicating a value, an emotional attachment, and a sentiment of said physical object with respect to said first user;
- detecting, by said processor via sensors of said hardware device, said physical object;
- monitoring, by said processor via said sensors, reactions of said first user with respect to additional physical objects located within a specified geographical boundary surrounding said first user;
- generating, by said processor based on analysis of said input data and said reactions of said user, a classification for said physical object;
- selecting, by said processor based on said classification, a geofence policy of said geofence policies;
- detecting, by said processor via said sensors, that said physical object has been removed from a first geofence for a specified time period threshold, wherein said first geofence is associated with said geofence policy; and
- executing, by said processor, an action associated with said detecting that said physical object has been removed from said first geofence, wherein said executing said action comprises:
  - detecting that said physical object has entered a second geofence associated with said geofence policy;
  - determining, based on analysis of said digital tag, that said second geofence is associated with a second user associated with said first user; and
  - receiving, from said first user, a disapproval for said physical object to be located within said second geofence;
  - modifying said geofence policy to include restrictions for said physical object to restricted from being located within said second geofence.

17. The hardware device of claim 16, wherein said executing said action further comprises:
- receiving, from said first user, an approval for said physical object to be located within said second geofence; and
- modifying said geofence policy to include permissions for said physical object to be located within said second geofence.

* * * * *